(12) United States Patent
Haik et al.

(10) Patent No.: US 7,803,262 B2
(45) Date of Patent: Sep. 28, 2010

(54) ALIGNMENT OF CARBON NANOTUBES USING MAGNETIC PARTICLES

(75) Inventors: Yousef Haik, Tallahassee, FL (US); Jhunu Chatterjee, Tallahassee, FL (US); Ching-Jen Chen, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 1140 days.

(21) Appl. No.: 10/831,493

(22) Filed: Apr. 23, 2004

(65) Prior Publication Data

US 2005/0239948 A1    Oct. 27, 2005

(51) Int. Cl.
*C02F 1/48* (2006.01)
*C08K 3/04* (2006.01)

(52) U.S. Cl. .............. 204/557; 423/461; 977/842; 977/845; 210/695; 209/212; 209/213; 209/214; 209/215; 524/496

(58) Field of Classification Search .............. 423/461; 264/429; 204/554, 557, 660, 664; 209/212–215, 209/232; 977/744, 745, 748, 749, 842, 845; 524/496; 210/695
See application file for complete search history.

(56) References Cited

U.S. PATENT DOCUMENTS

| | | | |
|---|---|---|---|
| 6,036,857 | A | 3/2000 | Chen et al. |
| 6,312,303 | B1 * | 11/2001 | Yaniv et al. .............. 445/24 |
| 6,436,221 | B1 | 8/2002 | Chang et al. |
| 6,569,937 | B2 * | 5/2003 | Foulger et al. .............. 524/496 |
| 6,741,019 | B1 * | 5/2004 | Filas et al. .............. 313/355 |
| 6,987,302 | B1 * | 1/2006 | Chen et al. .............. 257/368 |

(Continued)

FOREIGN PATENT DOCUMENTS

WO    0130694 A1    5/2001

(Continued)

OTHER PUBLICATIONS

Tohru Kimura, Hiroki Ago, Masayuki Tobita, Satoshi Ohshima, Mustumasa Kyotani, and Motoo Yumura, "Polymer Composites of Carbon Nanotubes Aligned by a Magnetic Field," Advanced Materials, v14 No. 19, Oct. 2, 2002, pp. 1380-1383.*

(Continued)

*Primary Examiner*—Timothy C Vanoy
*Assistant Examiner*—Diana J Liao
(74) *Attorney, Agent, or Firm*—Sutherland Asbill & Brennan LLP

(57) ABSTRACT

Methods are provided for aligning carbon nanotubes and for making a composite material comprising aligned carbon nanotubes. The method for aligning carbon nanotubes comprises adsorbing magnetic nanoparticles to carbon nanotubes dispersed in a fluid medium to form a magnetic particle-carbon nanotube composite in the fluid medium; and exposing the composite to a magnetic field effective to align the nanotubes in the fluid medium. The method for making a composite material comprising aligned carbon nanotubes comprises (1) adsorbing magnetic nanoparticles to carbon nanotubes to form a magnetic particle-carbon nanotube composite; (2) dispersing the magnetic particle-carbon nanotube composite in a fluid matrix material to form a mixture; (3) exposing the mixture to a magnetic field effective to align the nanotubes in the mixture; and (4) solidifying the fluid matrix material to form a nanotube/matrix material composite comprising the aligned nanotubes which remain aligned in the absence of said magnetic field.

21 Claims, 2 Drawing Sheets

U.S. PATENT DOCUMENTS

| | | |
|---|---|---|
| 2002/0098135 A1 | 7/2002 | Smalley et al. |
| 2003/0146529 A1 | 8/2003 | Chen et al. |
| 2004/0065969 A1 | 4/2004 | Chatterjee et al. |
| 2007/0176319 A1 | 8/2007 | Thostenson et al. |

FOREIGN PATENT DOCUMENTS

| | | | |
|---|---|---|---|
| WO | WO 03/060941 | * | 7/2003 |

OTHER PUBLICATIONS

Yu-Suk Cho, Gyu-Seok Choi, Sang-Young Hong, Dojin Kim, "Carbon nanotube synthesis using a magnetic field via thermal chemical vapor deposition," Journal of Crystal Growth 243, 2002, pp. 224-229.*

R. Haggenmueller, H.H. Gommans, A.G. Rinzler, J.E. Fischer, K.I. Winey, "Aligned single-wall carbon nanotubes in composites by melt processing methods," Chemical Physics Letters 330, Nov. 10, 2000, pp. 219-225.*

Erik T. Thostenson, Zhifeng Ren, Tsu-Wei Chou, "Advances in the science and technology of carbon nanotubes and their composites: a review," Composites Science and Technology 61, 2001, pp. 1899-1912.*

P.K. Wu, J. Fitz-Gerald, A. Pique, D.B. Chrisey, and R.A. McGill, "Deposition of Nanotube Composites using Matrix-Assisted Pulsed Laser Evaporation," Materials Research Society Symposium vol. 617, 2000, pp. J2.3.1-6.*

E. Durgun, S. Dag, V. M. K. Bagci, O. Gülseren, T. Yildirim, and S. Ciraci, "Systematic study of adsorption of single atoms on a carbon nanotube" Physical Review B 67, 201401R 2003, pp. 1-4.*

Yan-Hui Li , Shuguang Wang, Zhaokun Luan, Jun Ding, Cailu Xu, Dehai Wu, "A dsorption of cadmium(II) from aqueous solution by surface oxidized carbon nanotubes" Carbon 41 (2003), pp. 1057-1062.*

E. Raymundo-Piñero, D. Cazorla-Amoros, A. Linares-Solano, S. Delpeux, E. Frackowiak , K. Szostak , F. Béguin, "High surface area carbon nanotubes prepared by chemical activation" Carbon 40 (2002), pp. 1597-1617.*

Gou, et al., Title: "Development of Nanotube Bucky Paper/Epoxy Nanocomposites," Proceedings of the TEXCOMP-6 International Symposium on Textile Composites, Sep. 11-13, 2002, pp. 1-5.

Wang, et al., Title: "Fabrication and Characterization of In-Plane Aligned Nanotube Composites with Magnetically Aligned Carbon Nanotube Bucky Papers," Proc. 14th Int. Conf. on Composite Materials (ICCM-14), 1 (San Diego, CA , Jul. 14-18), - (2003) pp. 1-7.

Gou, et al., Title: "Process Analysis and Optimization of SWNT Bucky Paper Reinforce Epoxy Composites," Proceedings of the 48th International Society for Advancement of Material Process Engineering (SAMPE) Symposium and Exhibition, Long Beach, CA May 12-14, 2003, pp. 1-12.

Dai, Title: "Carbon Nanotubes Opportunities and Challenges," Surface Science 500 (2002), pp. 218-241.

Ajayan, et al. "*Aligned Carbon Nanotube Arrays Formed by Cutting a Polymer Resin-Nanotube Composite*", Science, vol. 265, pp. 1212-1214 (Aug. 26, 1994).

Andrews, et al. "*Nanotube composite carbon fibers*", Applied Physics Letters, 75(9): pp. 1329-1331 (Aug. 30, 1999).

Chauvet, et al. "Magnetic anisotropies of aligned carbon nanotubes", The American Physical Society, 52(10): pp. 6963-6966 (Sep. 1, 1995).

Chen, et al. "*Electrochemical synthesis of polypyrrole/carbon nanotube nanoscale composites using well-aligned carbon nanotube arrays*", Applied Physics A, vol. 73, pp. 129-131 (2001).

Fujiwara, et al. "*Magnetic Orientation and Magnetic Properties of a Single Carbon Nanotube*", The Journal of Physical Chemistry, 105(18): pp. 4383-4386 (May 10, 2001).

Garg, et al. "*Effect of chemical functionalization on the mechanical properties of carbon nanotubes*", Chemical Physics Letters, 295(4): pp. 273-278 (Oct. 16, 1998). Abstract.

Knez, et al. "*Electrochemical modification of individual nano-objects*", Journal of Electroanalytical Chemistry, vol. 522: pp. 70-74 (2002).

Lourie, et al. "*Evaluation of Young's modulus of carbon nanotubes by micro-Raman spectroscopy*", Journal of Materials Research, 13(9): pp. 2418-2422 (Sep. 1998).

Qian, et al. "*Load transfer and deformation mechanisms in carbon nanotube-polystyrene composites*", Applied Physics Letters, 76(20): pp. 2868-2870 (May 15, 2000).

Smith, et al. "*Structural anisotropy of magnetically aligned single wall carbon nanotube films*", Applied Physics Letters, 77(5): pp. 663-665 (Jul. 31, 2000).

Stéphan, et al. "*Characterization of singlewalled carbon nanotubes-PMMA composites*", Synthetic Metals, 108(2): pp. 139-149 (Jan. 17, 2000). Abstract.

Velasco-Santos, et al. "*Chemical functionalization of carbon nanotubes through an organosilane*", Nanotechnology, vol. 13, pp. 495-498 (2002). Abstract.

Wang, et al. "*Growth and characterization of buckybundles*", Applied Physics Letters, 62(16): pp. 1881-1883 (Apr. 19, 1993).

Ajayan, et al., "Single-Walled Carbon Nanotube-Polymer Composites: Strength and Weakness," *Advanced Materials* 12:750-753 (2000).

Cooper, et al., "Distribution and Alignment of Carbon Nanotubes and Nanofibrils in a Polymer Matrix," *Composites Science and Technology* 62:1105-1112 (2002).

de Heer, et al., "Aligned Carbon Nanotube Films: Production and Optical and Electronic Properties," *Science* 268:845-847 (1995).

Dresselhaus, et al., *Graphite Fiber and Filament* (M. Cardon, Ed.) pp. 12-34 (Springer, Berlin 1988).

Fan, et al., "Self-Oriented Regular Arrays of Carbon Nanotubes and Their Field Emission Properties," *Science* 283:512-514 (1999).

Hertel, et al., "Deformation of Carbon Nanotubes by Surface van der Waals Forces," *Physical Review B*. 58:13870-13873 (1998).

Holloway, et al., "Texture Development Due to Preferential Grain Growth of Ho-Ba-Cu-O in 1.6-T Magnetic Field," *J. Mat. Res.* 8:727-733 (Apr. 1993).

Kumar, et al., "Fibers from Polypropylene/Nano Carbon Fiber Composites," *Polymer* 43:1701-1703 (2002).

Kyotani, et al., "Preparation of Ultrafine Carbon Tubes in Nanochannels of an Anodic Aluminum Oxide Film," *Chem. Mater.* 8:2109-2113 (1996).

Li, et al., "Large-Scale Synthesis of Aligned Carbon Nanotubes," *Science* 274:1701-1703 (1996).

Ni, et al., "Chemical Functionalization of Carbon Nanotubes through Energetic Radical Collisions," *Physical Review B*. 61:R16343-R16346 (2000).

Treacy, et al., "Exceptionally High Young's Modulus Observed for Individual Carbon Nanotubes," *Nature* 381:678-680 (1996).

Velasco-Santos, et al. "Chemical Functionalization of Carbon Nanotubes through an Organosilane," *Nanotechnology* 13:495-498 (2000).

Wood, et al., "Orientation of Carbon Nanotubes in Polymers and its Detection by Raman Spectroscopy," *Composites: Part A* 32:391-399 (2001).

* cited by examiner

20nm

20nm

ALIGNMENT OF CARBON NANOTUBES USING MAGNETIC PARTICLES

BACKGROUND OF THE INVENTION

This invention relates generally to carbon nanotubes, and more particularly to methods for aligning carbon nanotubes in the production of composite materials.

Carbon nanotubes have attracted the attention of materials scientists and engineers in connection with the production of composite materials, since their recent discovery. See, e.g., Dresselhaus, et al., in *Graphite Fiber and Filament* (M. Cardon, Ed.) (Springer, Berlin 1988). A carbon nanotube possesses unique physical properties with a very high length to diameter ratio, such that it is one of the strongest fibers known. Both single wall and multiwall nanotubes have very high Young's modulus, stiffness, and flexibility as demonstrated by experimental studies and theoretical modeling. See Tracy, et al., *Nature,* 381:678 (1996); Loirie, et al., *J. Mat. Res.* 13: 2418 (1998). The nanotube has an elastic modulus of about 1-2 Tpa, whereas that of an ordinary carbon fiber is about 750 Gpa. It is believed that this unique property can make carbon nanotubes highly useful in the production of composite materials and other ultrastrong materials. See Garg, et al., *Chem. Phys. Lett.* 295:273 (1998); Ajayan, et al., *Adv. Materials* 12:750 (2000); Ni, et al., *Phys. Rev. B* 61:R1613 (2000).

Uniform polymeric nanotube composites have been produced by a solution evaporation technique assisted by high-energy sonication, with thin homogeneous films (200 to 500 nm) produced by spin coating a few drops of the solution onto glass. See Stephan, et al., *Synthetic Metals* 108:139-49 (2000); Qian, et al., *Appl. Phys. Lett.* 76(20):2868-70 (2000). Nanotube composites can also be produced in the form of fibers. The fibers can be produced by extrusion (Andrews, et al., *Appl. Phys. Lett.* 75(9):1329-31 (1999)) or drawing (Kumar, et al., *Polymer* 43:1701-03 (2002)), where mechanical shear is used to orient bundles of nanotubes. It is difficult, however, to produce well-dispersed carbon nanotubes in a polymer, because the amount of nanotubes used in either the dispersion or the extrusion technique is very small compared to the amount of polymer. Aligned carbon nanotubes also have been produced in a polymer matrix using electrochemical synthesis. See Chen, et al., *Appl. Phys. A,* 73:129-31 (2001).

The ability to enforce a preferred alignment of carbon nanotubes in composites is important to draw anistropic behavior from them. See Bermejo, et al., *J. Amer. Ceramic Soc.* 78:365-68 (1995); Holloway, et al., *J. Mat. Res.* 8 (April 1993). Various techniques for aligning nanotubes have been reported, such as carbon arc discharge (Wang, et al., *Appl. Phys. Lett.* 62:1881 (1993)), clipping of epoxy resins (Ajayan, et al., *Science* 265:1212 (1994)), rubbing of films (de Heer, et al., *Science* 268:845 (1995)), chemical vapor deposition (Li, et al., *Science* 274:1701 (1996); Kyotani, et al., *Chem. Mater.* 8:2109 (1996); Fan, et al., *Science* 283:512 (1999)), and mechanical stretching of nanotubes in a polymer matrix (Jin, et al., *Appl. Phys. Lett.* 73:1997 (1998)). Magnetic orientation based on difference in magnetic susceptibility between the carbon nanotubes and the polymer has also been reported (Smith, et al., *Appl. Phys. Lett.* 77:663-65 (2000); Fujiwara, et al., *J. Phys. Chem.* 105(18):4383-86 (2001)). However, the magnetic susceptibility of both the polymer and the carbon nanotubes is very weak, on the order of 10-6 (Chauvet, et al., *Phys. Rev. B* 52(10):6963-36 (1995)), and requires high magnetic fields, e.g., about 15-25 tesla, to induce the orientation. Such a process is expensive and uneconomical for industrial applications, such as the manufacture of polymeric composites. It therefore would be desirable to provide improved and less costly methods for aligning carbon nanotubes. It would further be desirable to be able to use less powerful (i.e., producing weaker magnetic fields), more readily available and easy to use magnets to induce alignment of carbon nanotubes in making composite materials.

Several methods have been reported for chemical modification of nanotubes. These include silanization (Velasco-Santos, et al., *Nanotechnology* 13:495 (2002)) and electrochemical modification (Knez, et al., *J. Electroana. Chem.* 522:70 (2002)). It would be desirable to provide improved nanotube alignment techniques that avoid chemically modifying the carbon nanotube.

SUMMARY OF THE INVENTION

Methods are provided for aligning carbon nanotubes by adsorbing magnetic nanoparticles to the carbon nanotubes and for making composite materials comprising aligned carbon nanotubes in a matrix material.

In one aspect, the method for aligning carbon nanotubes comprises adsorbing magnetic nanoparticles to carbon nanotubes dispersed in a fluid medium to form a magnetic particle-carbon nanotube composite in the fluid medium; and then exposing the composite to a magnetic field effective to align the nanotubes in the fluid medium. In another aspect, a method is provided for making a composite material comprising aligned carbon nanotubes. The method comprises (1) adsorbing magnetic nanoparticles to carbon nanotubes to form a magnetic particle-carbon nanotube composite; (2) dispersing the magnetic particle-carbon nanotube composite in a fluid matrix material to form a mixture; (3) exposing the mixture to a magnetic field effective to align the nanotubes in the mixture; and (4) solidifying the fluid matrix material to form a nanotube/matrix material composite comprising the aligned nanotubes which remain aligned in the absence of said magnetic field.

In certain embodiments of the methods, the magnetic nanoparticles comprise iron, nickel, cobalt, or an alloy thereof. In one embodiment, the magnetic nanoparticles comprise magnetite or maghemite. In one embodiment, the weight ratio of the magnetic nanoparticles to the carbon nanotubes in the matrix material is between about 100:1 and 1:2.

In one embodiment, the fluid medium, or the matrix material, comprises a polymer, copolymer or blend thereof. In other embodiments, the matrix material comprises a gel, a ceramic, or a metal.

In one embodiment of the method, the fluid matrix material comprises a matrix material at a temperature above its melting temperature and the solidifying step comprises cooling the matrix material below its melting temperature. In one particular variation of this method, the matrix material comprises a thermoplastic polymer.

In another embodiment of the method, the fluid matrix material comprises a solution of a matrix material dissolved or dispersed in a solvent and the solidifying step comprises removing the solvent.

In yet another embodiment of the method, the fluid matrix material comprises a crosslinkable matrix material and the solidifying step comprises a reaction which crosslinks the matrix material. In one particular variation of this method, the matrix material comprises a polymer or polymer precursor, such as an epoxy resin. In a further embodiment, the fluid matrix material comprises a matrix material at a temperature below the temperature effective to initiate cross-linking of the matrix material and the solidifying step comprises heating the fluid matrix material to a temperature and for a time effective to cause the matrix material to self-cross link.

In another aspect, a composite material is provided, which comprises a matrix material, aligned carbon nanotubes in at least a portion of the matrix material, and magnetic nanoparticles adsorbed to the carbon nanotubes. In one embodiment, the matrix material comprises a polymer. In another embodiment, the magnetic nanoparticles comprise iron, nickel, cobalt, or an alloy thereof.

DESCRIPTION OF THE INVENTION

Figure 1:
FIG. 1 is a STEM micrograph showing magnetic nanoparticles attached to carbon nanotubes.

Methods have been developed for inducing preferred orientation of magnetic nanotubes by physically attaching magnetic nanoparticles to the surface of the carbon nanotubes. The physical attachment of nanomagnetic particles with the carbon nanotubes enables easier and better alignment of the nanotubes in a weak magnetic field. In one embodiment, the aligned carbon nanotubes are provided in a matrix material, forming a composite structure.

The attachment is believed to be by physical adsorption, as the carbon nanotubes have a strong physical adsorption capacity due to Van der Waals forces on the nanotubes. The strong Van der Waals force exerted by the surface of the nanotubes can physically attach iron oxide onto almost all of its available surface. This level of attachment is due to the graphene sheet structure of the nanotubes, which provides a large surface area. It has been reported that nanotubes only interact by Vander Waals force to attach with a substrate and that the elastic deformation caused by this attachment is considerable. See Hertel, et al., *Phys. Rev. B* 58:13870 (1998). Accordingly, it has been concluded that the Van der Waals interaction between the nanotubes and the surfaces on which they rest is strong enough itself to change the shape of the nanotubes.

As used herein, the terms "comprise," "comprising," "include," and "including" are intended to be open, non-limiting terms, unless the contrary is expressly indicated.

Methods of Nanotube Alignment and Composite Production

In one aspect, a method is provided for aligning carbon nanotubes. One embodiment of the method comprises (1) adsorbing magnetic nanoparticles to carbon nanotubes dispersed in a fluid medium to form a magnetic particle-carbon nanotube composite in the fluid medium; and (2) exposing the composite to a magnetic field effective to align the nanotubes in the fluid medium.

In another aspect, a method is provided for making a composite material comprising such aligned carbon nanotubes. One embodiment of the method comprises (1) adsorbing magnetic nanoparticles to carbon nanotubes to form a magnetic particle-carbon nanotube composite; (2) dispersing the magnetic particle-carbon nanotube composite in a fluid matrix material to form a mixture; (3) exposing the mixture to a magnetic field effective to align the nanotubes in the mixture; and (4) solidifying the fluid matrix material to form a nanotube/matrix material composite comprising the aligned nanotubes which remain aligned in the absence of said magnetic field.

In one embodiment, the fluid medium (as recited in the first method) is a fluid matrix material (as recited in the second method).

A variety of techniques can be selected for fluidization and solidification of the matrix material. In one embodiment, the fluid matrix material comprises a matrix material at a temperature above its melting temperature and the solidifying step comprises cooling the matrix material below its melting temperature. For example, the matrix material could be melted, the nanoparticles-nanotube composite dispersed in the liquid matrix material, and then the mixture subjected to a magnetic field to align the nanotubes and while cooling the matrix material to solidify it sufficiently to maintain nanotube alignment. This method can be used for thermoplastic polymer matrix materials, as well as metals and glasses.

In another embodiment, the fluid matrix material comprises a solution of a matrix material dissolved or dispersed in a solvent and the solidifying step comprises removing the solvent. This method can be used for a variety matrix materials, including polymers and metals. One skilled in the art can select a suitable solvent/non-solvent system for a particular polymer based, at least in part, on the polymer's solubility at ambient and elevated temperatures.

In yet another embodiment, the fluid matrix material comprises a crosslinkable matrix material and the solidifying step comprises a reaction which crosslinks the matrix material. For example, the fluid matrix material could comprise a matrix material at a temperature below the temperature effective to initiate cross-linking of the matrix material, and then the fluid matrix material could be heated to a temperature and for a time effective to cause the matrix material to self-crosslink. These methods could be used with thermoset polymers and polymer precursors, such as epoxies.

In other embodiments, the nanotubes with adsorbed magnetic particles are incorporated into a gel, a metal, or a ceramic matrix material. As long the magnetic force is greater than the viscous force of the fluidized matrix material (e.g., any liquid material that will solidify), then the carbon nanotubes with adsorbed magnetic particles will align.

The Magnetic Nanoparticles

As used herein, the term "magnetic nanoparticles" includes magnetic, paramagnetic, and superparamagnetic materials. The nanoparticles can comprise iron, nickel, cobalt, and/or their alloys. In one embodiment, the nanoparticles comprise or consist essentially of an iron oxide, such as magnetite or maghemite ($\lambda Fe_2O_3$). In other embodiments, the magnetic nanoparticles comprise an alloy or a mixture of elemental materials. For example, the magnetic nanoparticles can comprise iron-neodymium-boron nanoparticles.

In one embodiment, the nanoparticles have an average diameter between about 3 nm and about 100 nm. In another embodiment, the nanoparticles have an average diameter between and including 5 and 50 nm. In still another embodiment, the nanoparticles have an average diameter between 5 and 10 nm.

The Carbon Nanotubes

As used herein, the terms "carbon nanotube" and the shorthand "nanotube" refer to carbon fullerene, a synthetic graphite, which typically has a molecular weight between about 840 and greater than 10 million. Carbon nanotubes are commercially available, for example, from Carbon Nanotechnologies, Inc. (Houston, Tex. USA), or can be made using techniques known in the art.

The amount of magnetic nanoparticles adsorbed to the carbon nanotubes can vary. The amount can depend, for example, on the surface area of the nanotube that is available for adsorption. For instance, if the single wall nanotube is a bundle of nanotubes rather than a single tube, then the available surface area is less than a single tube where both sides (i.e., inside and outside of tube) are available for attachment. In one embodiment, the ratio of the magnetic nanoparticles to the carbon nanotubes in the fluid medium or matrix material is about 1:1 by weight. In another embodiment, the ratio by weight of the magnetic nanoparticles to the carbon nanotubes in the fluid medium or matrix material is between about 100:1 and about 1:2.

Adsorption of the nanoparticles to the nanotubes is effected by bringing the two materials into intimate contact with one another, for example in a fluid medium. This preferably is done by dispersing the nanoparticles and nanotubes in a nonsolvent liquid medium and then vigorously mixing the dispersion, such as by sonication techniques known in the art.

As used herein, the term "nonsolvent" refers to liquid media that essentially are non-reactive with the nanotubes and in which the nanotubes are virtually insoluble. Examples of suitable nonsolvent liquid media include volatile organic liquids, such as acetone, ethanol, methanol, and n-hexane. Low-boiling point solvents are typically preferred so that the solvent can be easily and quickly removed from the matrix material.

In one embodiment, the adsorption step includes chemically activating sites on the carbon nanotubes that can attach to the nanoparticles. In another embodiment, the adsorption step includes inserting into the annular opening of the nanotubes a quantity of nanoparticles that have a smaller diameter than the inner diameter of the nanotubes.

The Magnetic Field

The magnetic field can be induced using simple magnets or other equipment well known in the art. The magnetic filed strength needed for effective alignment of the nanotubes can vary depending, for example, upon the amount of magnetic material attached to the nanotubes, the viscosity of the fluid medium, and the distance between the magnetic field and the fluid medium. The basic principle that allows this method to work is a balance between the magnetic force generated by the applied field (which is a function of the magnetic susceptibility, the volume of the magnetic material, the magnetic field, and the magnetic field gradient) and the resistance force (which is directly proportional to the viscous resistance of the fluid medium). In one embodiment, the strength of the magnetic field is between about 0.5 and about 1 T, inclusive of these end points.

Matrix Material

A wide variety of materials can be used as the matrix material. Selection of the appropriate material depends on the end use of the composite as well as the particular techniques employed to fluidize and solidify the matrix material. Examples of suitable matrix materials include polymers, ceramics, glasses, metals, alloys, and other composites. In one embodiment, the matrix material is amorphous. In another embodiment, the matrix material is crystalline.

In one embodiment, the matrix material is polymeric. That is, it comprises one or more oligomers, polymers, copolymers, or blends thereof. In one embodiment, the matrix material comprises a thermoplastic polymer. In another embodiment, the matrix material comprises a thermoset polymer, such as phenol formaldehyde resins and urea formaldehyde resins. Examples of polymers suitable for use in the process include polyolefins, polyesters, nonpeptide polyamines, polyamides, polycarbonates, polyalkenes, polyvinyl ethers, polyglycolides, cellulose ethers, polyvinyl halides, polyhydroxyalkanoates, polyanhydrides, polystyrenes, polyacrylates, polymethacrylates, polyurethanes, and copolymers and blends thereof.

In one embodiment, the fluid matrix material comprises a polymer precursor or a crosslinkable material. As used herein, the term "polymer precursor" refers to monomers and macromers capable of being polymerized. As used herein, the term "crosslinkable material" refers to materials that can crosslink with themselves or with another material, upon heating or addition of a catalysts or other appropriate initiator. In one preferred embodiment, the polymer precursor comprises an epoxy resin. In another embodiment, the polymer precursor comprises a cyanoacrylate.

The matrix material may further include one or more additives. Examples include as binding agents, surfactants, and wetting agents to aid in dispersing the nanotubes in the matrix material.

Nanotube/Matrix Material Composite and Uses Thereof

Composite materials are provided that comprises a matrix material, aligned carbon nanotubes in at least a portion of the matrix material, and magnetic nanoparticles adsorbed to the carbon nanotubes. The carbon nanotubes can be single wall or multiwall. The carbon nanotubes can be dispersed (heterogeneously or homogeneously) throughout the matrix material or can be located only in one or more regions, layers, or surfaces of a particular composite structure. In one embodiment, the matrix material comprises a polymer. In another embodiment, the magnetic nanoparticles comprise iron, nickel, cobalt, or an alloy thereof.

The methods described herein enable the alignment of carbon nanotubes using relatively inexpensive, weak, commercially available magnets. This enables the production and use of aligned nanotube/matrix material composites in a wide variety of structures for a range of different industries and applications. Examples possible uses include high strength, lightweight, structural members (e.g., for automotive body parts, athletic equipment, spacecraft), nanoelectronics, fuel cells (e.g., for the storage of hydrogen), and optical equipment and video displays (e.g., field emission displays). In one embodiment, the nanotube composite material is used in organic transistors, such as polyaniline doped single wall nanotubes. Nanotube-metal matrix materials can be used to make extremely strong structural materials for aircraft and spacecraft and for long power-transmission lines and suspension bridges.

In one embodiment, the nanotube/matrix material mixture, while the matrix material is in its fluidized state, is applied as a coating onto a substrate of another material and then is exposed to the magnetic field while the coating composition is solidified to maintain a desired alignment direction on the substrate article.

The amount of magnetic particle-carbon nanotube composite dispersed in the nanotube/matrix material composite can vary, depending on the desired physical properties of the particular composite and the particular use of the end product. The amount of magnetic particle-carbon nanotube composite present in the nanotube/matrix material composite can be between about 0.1% and 99.9%, but more typically is between about 1% and 50%, of the total dry weight of the nanotube/matrix material composite.

The methods and compositions can be further understood with the following non-limiting examples.

Example 1

Preparation of Single Wall Nanotubes-Magnetite Composite

Iron oxide was prepared by a conventional coprecipitation procedure. Ferrous chloride and ferric chloride were added in 2:1 molar proportion and precipitated by 10 M NaOH solution. The iron oxide precipitate was sonicated. The size range of the particles was 6 nm to 30 nm. Then, 0.10 mg of single wall nanotubes ("SWNTs") (obtained from Carbon Nanotechnologies, Inc., Houston, Tex.) was dispersed in methanol by ultrasonication. The magnetite precipitate in alkaline medium was added to the SWNT dispersion, and the resulting mixture was thoroughly stirred. A SWNT-magnetite composite was formed almost immediately, with the strong adsorption capacity of the SWNTs promoting the attachment of the magnetite particles to the SWNTs. The composite was attracted by 0.5 T magnets. No attraction of the nanotubes towards magnets was observed for nanotubes without adsorbed magnetic particles.

Example 2

Preparation of Polymer Composite Comprising Single Wall Nanotubes and Magnetite The SWNT-magnetite composite from Example 1 was mixed with a commercially available epoxy resin (PR 2032) and then further crosslinked with a hardener (PH 3660) at room temperature. The resin and hardener were mixed at a ratio of 3:1.

In a first sample, 12 mL of the resin/hardener mixture was thoroughly mixed with 1 mL of the SWNT-magnetite composite dispersion and placed into a 4 mL standard plastic cuvette with a lid. The mixture was allowed to set for 24 hours, forming a first solid polymeric composite block. The block was release by breaking the cuvette.

In a second sample, 12 mL of the resin/hardener mixture was thoroughly mixed with 1 mL of the SWNT-magnetite composite dispersion and placed into a 4 mL standard plastic cuvette with a lid. The cuvette was placed between two 0.5 T square-shaped, permanent magnets to align the SWNTs, and the mixture was allowed to set for 24 hours, forming a second polymeric composite block.

Using microtoming, 100 nm and 50 nm films were cut from the two blocks. Care was taken while cutting the samples to avoid causing any alignment, as it has been reported that the nanotubes in a polymer resin composite can be aligned by preferential cutting process (Ajayan, et al., *Science* 265:1212 (1994)).

Some of the 50 nm samples were placed on mica foil and atomic force microscopy ("AFM") was performed on these.

Figure 2:
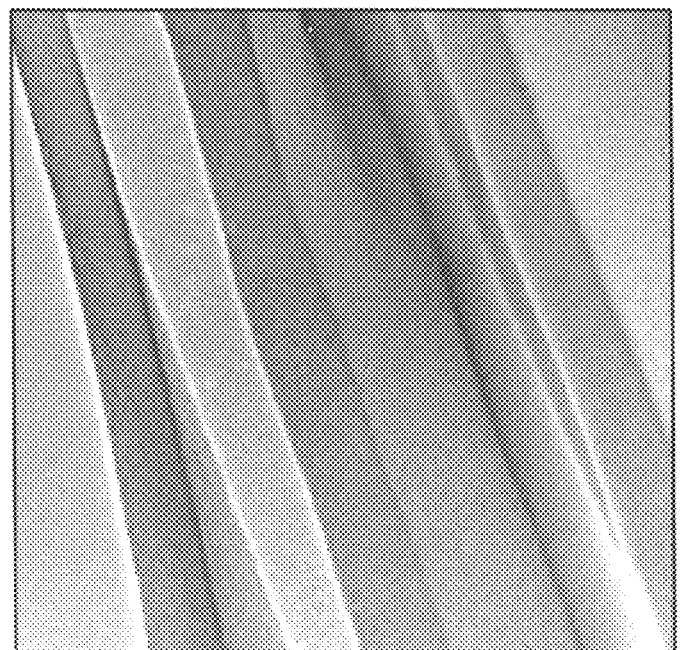
FIG. 2 is a STEM micrograph showing aligned carbon nanotubes in a polymer composite made using the magnetic process described herein.
Figure 3:
FIG. 3 is a ESEM micrograph showing unaligned carbon nanotubes in a polymer composite made without using the magnetic process described herein.
Figure 4:
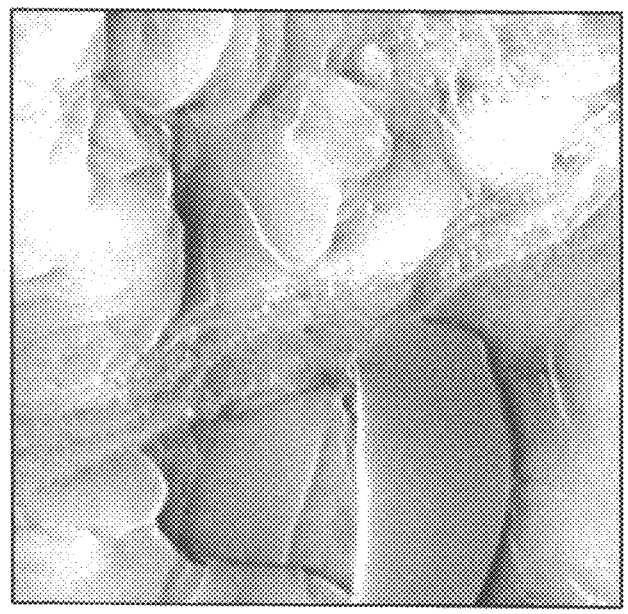
FIG. 4 is another ESEM micrograph showing unaligned carbon nanotubes in a polymer composite made without using the magnetic process described herein.

Scanning transmission electron microscopy ("STEM") micrographs taken of the 100 nm films from the second composite block (FIGS. 1 and 2) show (at different magnifications) that the iron oxide coupled with SWNTs aligned in the epoxy with the aid of the external magnetic field. Rope-like bundles of nanotubes with clusters of attached iron oxide nanoparticles were observed. Environmental scanning electron microscopy ("ESEM") micrographs of the 100 nm films from the first composite block (FIGS. 3 and 4) show the presence of unaligned SWNTs.

Near-infrared Raman spectra of the sample were obtained using a microRamn spectrograph, the JY Horiba LabRam HR 800, excited by a TUIO optics DL 100 grating-stabilized 80 mW diode laser emitting at 785 nm. Raman spectra for the SWNTs from Carbon Nanotechnology Inc., for the SWNT-iron oxide ($\lambda Fe_2O_3$) composite in alkaline medium, and the resin without SWNT were analyzed. The Raman spectra of carbon nanotubes include three important regions. The first region of signal is call radial breathing mode (RBM) where the frequency of vibration depends directly on the diameters of SWNTs. The second region is the tangential mode (TM), which gives some electronic properties of SWNTs. The third region is called the intermediate frequency range in which modes are expected to depend on the chirality of the SWNTs. The observed change in intensity ratio between tangential and radial breathing mode was explained as a function of tube diameters. The dispersive behavior in the intermediate zone was not substantial between the commercially obtained SWNTs and the SWNT-magnetite composite in alkaline medium from Example 1. Raman laser micrograph for the same block (as observed in the side of the block closer to the magnetic field) showed the aligned bundle of nanotubes. No aligned phase was observed for the sample from the composite block made without the magnetic field.

In summary, attachment of magnetic particles to nanotubes has been observed using ESEM, STEM, and AFM, and the alignment of these nanotubes in the presence of magnetic fields has be confirmed by STEM, ESEM, and Raman laser microscopy.

Publications cited herein and the materials for which they are cited are specifically incorporated by reference. Modifications and variations of the methods and devices described herein will be obvious to those skilled in the art from the foregoing detailed description. Such modifications and variations are intended to come within the scope of the appended claims.

We claim:

1. A method for aligning carbon nanotubes, the method comprising:
   adding magnetic nanoparticles to the carbon nanotubes dispersed in a fluid medium to form a dispersion of magnetic nanoparticles and carbon nanotubes;
   adsorbing the magnetic nanoparticles directly to the carbon nanotubes dispersed in the fluid medium to form a magnetic particle-carbon nanotube composite dispersed in the fluid medium; and
   placing the magnetic particle-carbon nanotube composite dispersed in the fluid medium between magnets to expose the magnetic particle-carbon nanotube composite in the fluid medium to a magnetic field effective to align the nanotubes of the magnetic particle-carbon nanotube composite dispersed in the fluid medium.

2. The method of claim 1, wherein the magnetic nanoparticles comprise iron, nickel, cobalt, or an alloy thereof.

3. The method of claim 2, wherein the magnetic nanoparticles comprise magnetite or maghemite.

4. The method of claim 1, wherein the fluid medium comprises a polymer, copolymer or blend thereof.

5. The method of claim 1, wherein the ratio of the magnetic nanoparticles to the carbon nanotubes is between about 100:1 and 1:2 by weight.

6. A method for making a composite material comprising aligned carbon nanotubes, the method comprising:
   chemically activating adsorption sites on a plurality of carbon nanotubes;
   adsorbing magnetic nanoparticles to the carbon nanotubes to form a magnetic particle-carbon nanotube composite;

dispersing the magnetic particle-carbon nanotube composite in a fluid matrix material to form a fluid mixture;

placing the fluid mixture between magnets to expose the mixture to a magnetic field effective to align the nanotubes in the fluid mixture; and solidifying the fluid matrix material to form a nanotube/matrix material composite comprising the aligned nanotubes which remain dispersed and aligned in the absence of said magnetic field.

7. The method of claim 6, wherein the magnetic nanoparticles comprise iron, nickel, cobalt, or an alloy thereof.

8. The method of claim 6, wherein the magnetic nanoparticles comprise magnetite or maghemite.

9. The method of claim 6, wherein the amount of magnetic particle-carbon nanotube composite present in the nanotube/matrix material composite is between about 1% and 50% of the total dry weight of the nanotube/matrix material composite.

10. The method of claim 6, wherein the matrix material comprises a polymer, copolymer or blend thereof.

11. The method of claim 6, wherein the fluid matrix material comprises a matrix material at a temperature above its melting temperature and the solidifying step comprises cooling the matrix material below its melting temperature.

12. The method of claim 11, wherein the matrix material comprises a thermoplastic polymer.

13. The method of claim 6, wherein the fluid matrix material comprises a solution of a matrix material dissolved or dispersed in a solvent and the solidifying step comprises removing the solvent.

14. The method of claim 13, wherein the matrix material comprises a polymer or a ceramic.

15. The method of claim 6, wherein the fluid matrix material comprises a crosslinkable matrix material and the solidifying step comprises a reaction which crosslinks the matrix material.

16. The method of claim 15, wherein the matrix material comprises a polymer or polymer precursor.

17. The method of claim 15, wherein the matrix material comprises an epoxy resin.

18. The method of claim 6, wherein the fluid matrix material comprises a matrix material at a temperature below the temperature effective to initiate cross-linking of the matrix material and the solidifying step comprises heating the fluid matrix material to a temperature and for a time effective to cause the matrix material to self-crosslink.

19. The method of claim 1, wherein the magnetic particle-carbon nanotube composite is exposed to a magnetic field magnetic field between about 0.5 and about 1 T.

20. The method of claim 6, wherein the magnetic particle-carbon nanotube composite is exposed to a magnetic field magnetic field between about 0.5 and about 1 T.

21. A method for aligning carbon nanotubes, the method comprising:

adding magnetic nanoparticles to the carbon nanotubes dispersed in a nonsolvent liquid medium to form a dispersion of magnetic nanoparticles and carbon nanotubes;

adsorbing clusters of the magnetic nanoparticles directly to discrete portions of the carbon nanotubes dispersed in the nonsolvent liquid medium to form a magnetic particle-carbon nanotube composite in the nonsolvent liquid medium; and exposing the magnetic particle-carbon nanotube composite in the nonsolvent liquid medium to a magnetic field effective to align the nanotubes of the magnetic particle-carbon nanotube composite in the nonsolvent liquid medium.

\* \* \* \* \*